United States Patent
Gollan

[19]

[11] Patent Number: 6,039,870
[45] Date of Patent: Mar. 21, 2000

[54] RADIAL WOUND FIBER DISK

[76] Inventor: Arye Z. Gollan, 110 Oxford Rd., Newton, Mass. 02159

[21] Appl. No.: 09/072,718

[22] Filed: May 5, 1998

[51] Int. Cl.[7] .......................... B01D 63/02; B01D 63/04; B01D 63/10; B01D 633/12

[52] U.S. Cl. ................................ 210/321.61; 210/321.74; 210/321.83; 210/500.23; 264/41; 428/371; 55/520; 96/10

[58] Field of Search .................. 96/4, 8, 10; 210/321.74, 210/321.75, 321.76, 321.83, 321.84, 321.85, 500.23, 488; 428/37, 371, 398; 264/41; 55/520, 523

[56] References Cited

U.S. PATENT DOCUMENTS

| | | | |
|---|---|---|---|
| 3,556,302 | 1/1971 | Agranat | 210/321.84 |
| 4,789,480 | 12/1988 | Brushke | 210/321.85 |
| 4,861,476 | 8/1989 | Kohlheb et al. | 96/10 |
| 5,204,002 | 4/1993 | Belfort et al. | 210/321.83 |
| 5,626,758 | 5/1997 | Belfort | 210/636 |
| 5,639,365 | 6/1997 | McLoughlin et al. | 210/321.83 |

FOREIGN PATENT DOCUMENTS 54-53681   4/1978   Japan ................ 210/500.23

Primary Examiner—Joseph W. Drodge
Attorney, Agent, or Firm—Fish and Richardson P.C.

[57] ABSTRACT

A radially wound tubular fiber disk comprises a single strand of tubular fiber having a feed inlet at one end and a feed outlet at the other. Radially arranged adhesive strips forming seams maintain a desired spacing between adjacent convolutions of the tubular fiber disk and hold the disk in place.

13 Claims, 4 Drawing Sheets

RADIAL WOUND FIBER DISK

The present invention relates in general to hollow fiber membranes and more particularly concerns novel radial wound tubular fiber membrane disks and methods of making and using.

Membranes are typically manufactured in either flat sheet or cylindrical geometries and then formed into a range of devices. Flat sheet membranes are typically incorporated into plate and frame or spiral-wound modules. Cylindrical membranes, such as hollow fibers, tubules and tubes, may be operated as independent tubes or bundled into parallel channel modules, such as in a shell and tube design. In some applications, such as gas separation, cylindrical membranes, for example, hollow fibers, are wound on a core, much as a string-wound cartridge filter is manufactured. The hollow fiber membrane configuration is especially advantageous for module compactness.

It is an important object of the invention to provide an improved hollow fiber or tubule membrane embodied in a compact module.

According to the invention, at least one hollow fiber or tubule membrane having a feed inlet at one end and a feed outlet at the other end is formed into a compact module by winding it radially to form a disk. The disk typically extends between an inner loop and an outer loop with one of the feed inlet and feed outlet outside the outer loop and the other inside the inner loop. According to an aspect of the invention, the disk has the form of a figure of eight and resides predominantly within an outer loop with both the feed inlet and feed outlet outside the outer loop. There may be a number of the disks axially spaced along a common axis. A casing formed with a single feeder inlet, a single feeder outlet and a permeate outlet may enclose the axially spaced disks.

The disk may be made by winding the at least one strand of tubular fiber in a plane about itself and laying a strip of adhesive material along radii to hold the spiral formed thereby in place. The adhesive strips may be equiangularly spaced about the axis of the disk. A number of the disks may be formed and stacked in axially spaced relationship about a common axis. The stacked disks may be encased in a casing formed with a common feed inlet header, a common feed outlet header and permeate outlet, and the feed inlets positioned in the common feed inlet header and the feed outlets positioned in the common feed outlet header. Fluid may be fed into the feed inlet permeate withdrawn from the permeate outlet and reject withdrawn from the feed outlet.

Among the advantages of the invention are significant improved compactness and a smaller feed flow rate than a multi-tubule module with shorter, parallel feed channels for the same membrane surface area.

Another advantage is that flowing the feed stream inside the fibers along the radial path can induce secondary flows which may provide better mixing and reduced concentration build-up at the membrane wall. The angular velocity increase that occurs as the feed fluid approaches the center of the radial disk will further enhance this effect to provide higher, more stable permeate flux levels.

Another advantage of the structure is that it is amenable to stacking of disks side by side to further increase membrane area in a compact module. A further advantage is that when a series of disks are stacked next to each other in either a vertical or a horizontal arrangement, there may be a single feed header to simplify the structure.

Still another advantage is that feed flow may occur on the outside of the fiber(s); that is, from the permeate side, when the radial disk is loosely wound.

Other features, objects and advantages will become apparent from the following detailed description when read in connection with the accompanying drawing in which.

Figure 1:
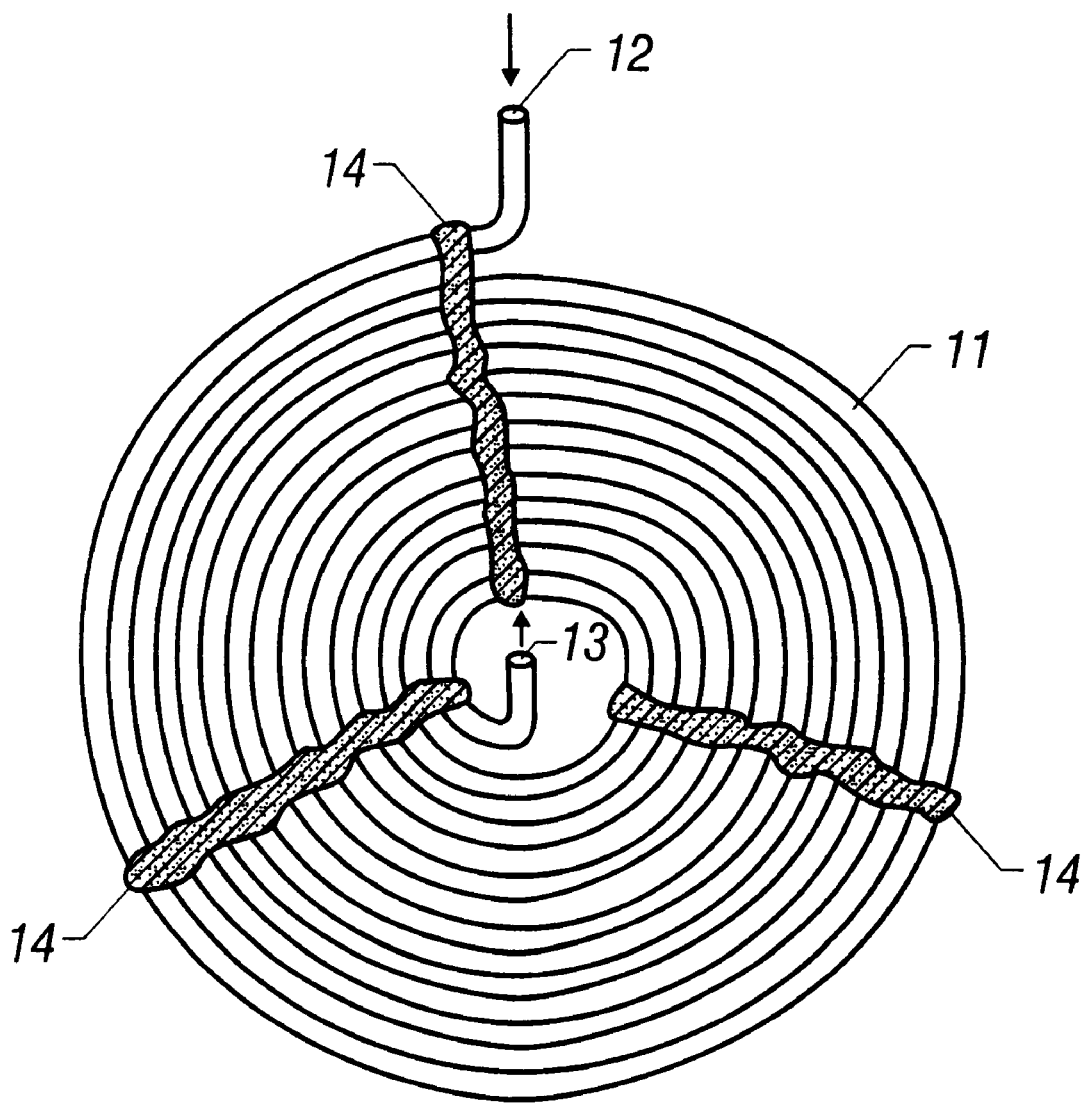
FIG. 1 is a plan view of a radially wound tubular fiber disk according to the invention.

With reference now to the drawings and more particularly FIG. 1 thereof, there is shown a plan view of a radially wound tubular fiber disk according to the invention. A single strand of tubular fiber 11 has an inlet 12 outside the outer loop and a feed outlet 13 inside the inner loop of the radial wound tubular continuous fiber. There are three equiangularly spaced glue seams 14 that maintain a desired spacing between adjacent convolutions and hold the spiral structure in place. These seams form bonds that maintain a desired spacing between adjacent convolutions and hold the spiral structure in place. The spacing between adjacent convolutions may vary by application. When operated with feed flow inside the fiber, the outer walls of the fiber may touch. When operating with feed flow from outside-in, more space may be left between adjacent convolutions.

The invention allows a six-to-ten-foot-long tubule with a nominal four mm outside diameter to be made into a compact radial disk, nominally only six-inches in diameter. Thus, a fiber/tubule length, which would be unacceptably long in a straight conventional cartridge design due to space or handling limitations, can be utilized in the radial disk design according to the invention. Moreover, a single field channel will require a smaller feed flow rate than a multi-tubule module with shorter, parallel feed channels for the same membrane surface area.

Figure 2:
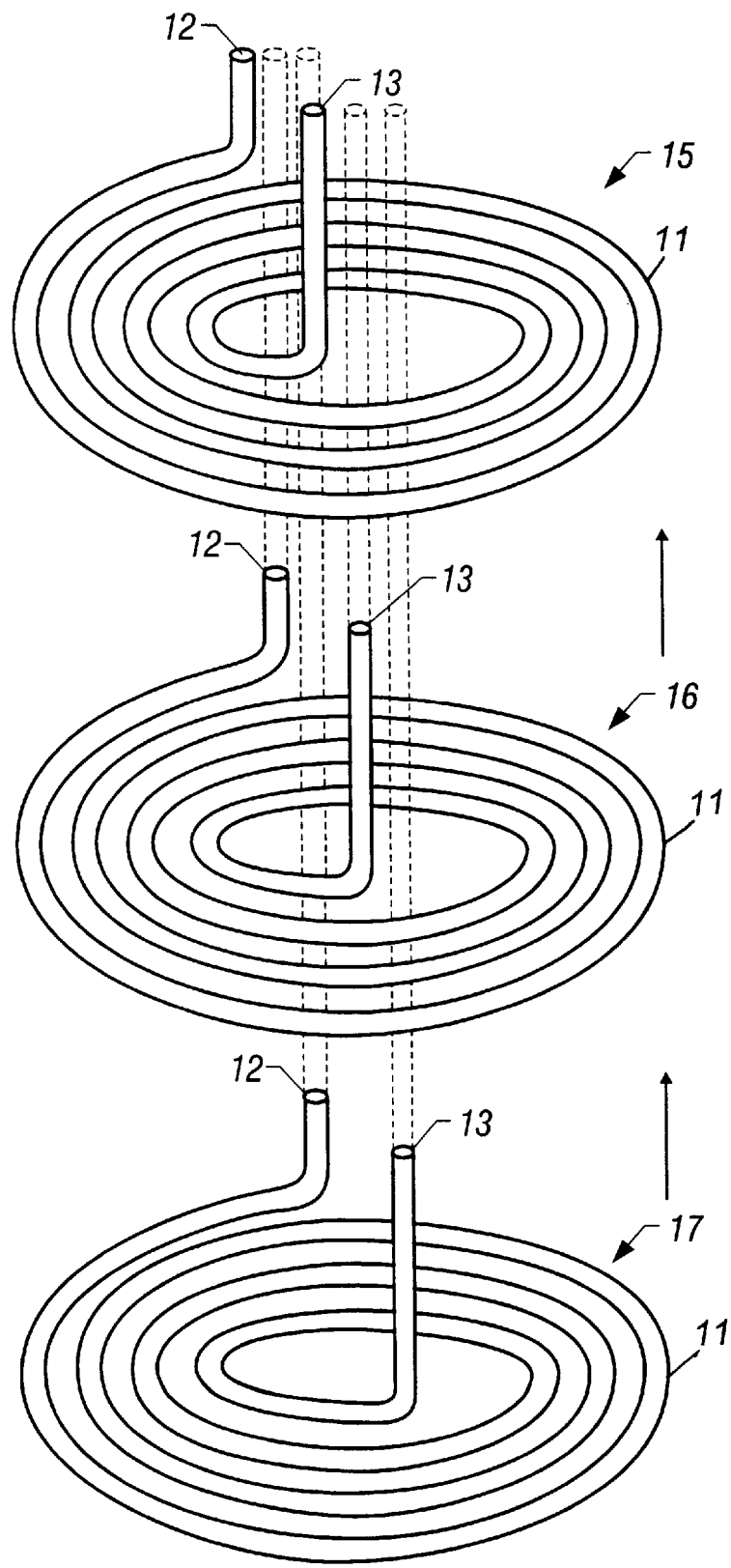
FIG. 2 is a perspective view of a stacking arrangement for radially wound tubular fiber disks according to the invention.

Referring to FIG. 2, there is shown a stacking arrangement for radially wound tubular fiber disks according to the invention showing disks 15, 16 and 17 axially spaced along a common axis. The broken lines indicate how the three feed inlets 12 and three feed outlets 13 may be contiguously arranged when disks 15, 16 and 17 are contracted in more closely spaced relationship.

Figure 3:
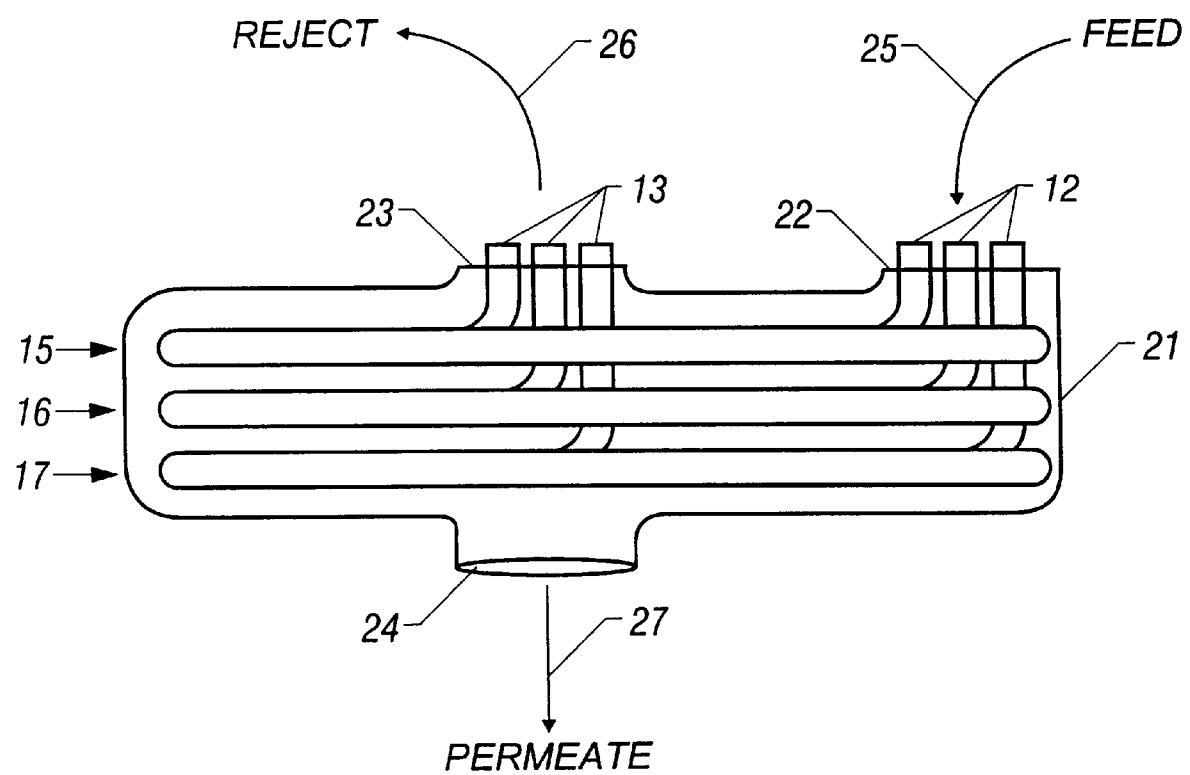
FIG. 3 is a pictorial representation of multiple radial wound tubular fiber disks with single feed header according to the invention.

Referring to FIG. 3, there is shown a pictorial representation of the multiple radially wound tubular fiber disks 15, 16 and 17 in a casing 21 with a single feed header 22, a single reject header 23 and a permeate outlet 24. Feed 25 enters at feed header 22, reject exits at feed outlet header 23 and permeate 27 exits at permeate outlet 24. This structural arrangement simplifies design.

Figure 4:
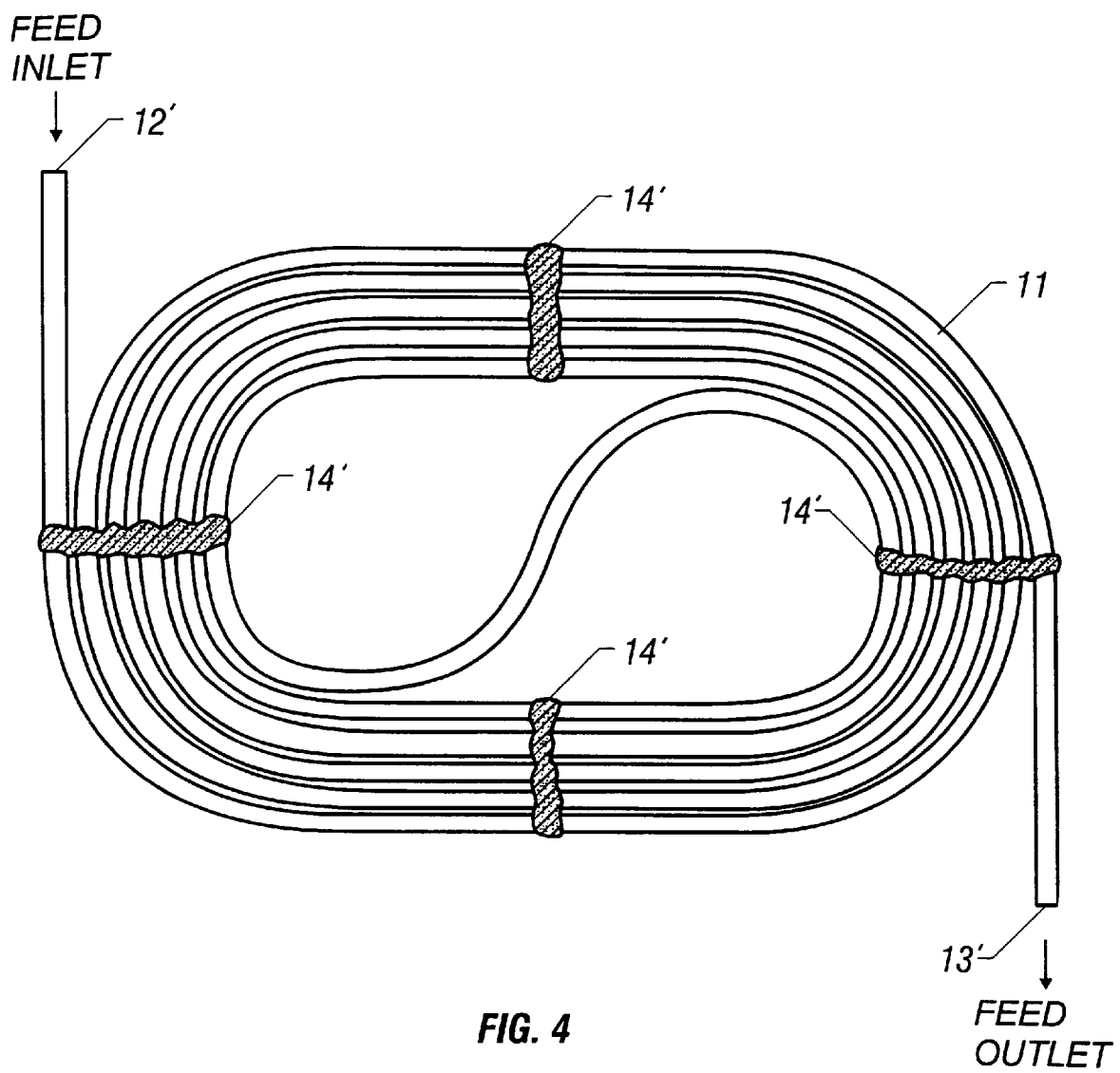
FIG. 4 is a pictorial representation of a radially wound tubular fiber disk in figure-of-eight configuration according to the invention.

Referring to FIG. 4, there is shown another embodiment of the invention of a radial wound tubular fiber disk in figure-of-eight configuration. A single strand of tubular fiber 11' has a feed inlet 12' and a feed outlet 13'. There are four equiangularly spaced glue or cement seams 14' to hold the tubular fiber in place as shown. An advantage of this arrangement is that both the feed inlet 12' and the feed outlet 13' may reside in the plane of the disk outside the circumference to facilitate forming a very compact structure easy to use.

The invention may be made by winding at least one strand of tubular fiber in a plane about itself and laying a strip of adhesive material along radii to hold the spiral formed thereby in place. The adhesive strips may be equiangularly spaced about the axis. A number of disks may be formed and stacked in axially spaced relationship about a common axis. The axially spaced disks may be encased in a casing formed with a common feed inlet header, a common feed outlet header and permeate outlet, and the feed inlets positioned in the common feed inlet header and the feed outlets positioned in the common feed outlet header.

In use fluid may enter the feed inlets, permeate may be withdrawn from the permeate outlet and reject withdrawn from the feed outlets.

There has been described novel apparatus and techniques for radially tubular fiber disks. It is evident that those skilled in the art may make numerous uses and modifications of and departures from the specific embodiments described herein without departing from the inventive concepts. For example, a number of strands of tubular fibers could be wound in a plane about themselves to form a radially wound fiber disk according to the invention. Consequently, the invention is to be construed as embracing each and every novel feature and novel combination of features present in or possessed by the apparatus and techniques herein disclosed and limited solely by the spirit and scope of the appended claims.

What is claimed is:

1. A radially wound tubular fiber disk comprising at least one strand of hollow fiber membrane having a feed inlet at one end and a feed outlet at the other and forming a spiral having a plurality of adjacent convolutions in a plane, and radially arranged seams forming bonds that maintain a desired spacing between adjacent convolutions and hold the spiral structure in place.

2. A radially wound tubular fiber disk in accordance with claim 1 wherein said disk extends substantially between an inner loop and an outer loop and one of said feed inlet and said feed outlet is outside said outer loop and the other of said feed inlet and said feed outlet is inside said inner loop.

3. A radially wound tubular fiber disk in accordance with claim 1 wherein said radial disk is characterized by a figure-of-eight configuration and resides predominantly within an outer loop and both said feed inlet and said feed outlet are outside said outer loop.

4. A radially wound tubular fiber disk in accordance with claim 1 and further comprising, at least another of said radially wound tubular fiber disks axially spaced from the first-mentioned radially wound tubular fiber disk along a common axis.

5. Apparatus in accordance with claim 4 and further comprising, a casing enclosing said axially spaced radially wound tubular fiber disks and formed with a single feeder inlet, a single feeder outlet and a permeate outlet.

6. Apparatus in accordance with claim 5 wherein the feed inlets are gathered in a common feed inlet header and the feed outlets are gathered in a common feed outlet header.

7. A method of using the apparatus of claim 5 including, delivering fluid to the feed inlets, withdrawing permeate from the permeate outlet, and withdrawing reject from the feed outlets.

8. A radially wound tubular fiber disk in accordance with claim 1 and comprising strips of adhesive material along a radii of said disk holding the formed spiral in place.

9. A radially wound tubular fiber disk in accordance with claim 8 wherein the plurality of said strips of adhesive material are equiangularly spaced about the axis of said disk.

10. A method of making the radially wound tubular fiber disk of claim 1 including, winding said at least one strand of tubular fiber membrane in a plane about itself and laying strips of adhesive material along radii of said radially wound tubular fiber disk to hold the spiral formed thereby in place.

11. A method in accordance with claim 10 and further including applying said adhesive material along radii that are equiangularly spaced about the axis of said radially wound tubular fiber disk.

12. A method in accordance with claim 10 and further including, forming at least one other of said radially wound fiber disks, and stacking said radially wound tubular fiber disks in axially spaced relationship about a common axis.

13. A method in accordance with claim 12 and further including encasing the stacked radially wound tubular fiber disks in a casing formed with a common feed inlet header and common feed outlet header and permeate outlet and positioning the feed inlets in said common feed inlet header and the feed outlets in the common feed outlet header.

* * * * *